United States Patent Office 3,377,253
Patented Apr. 9, 1968

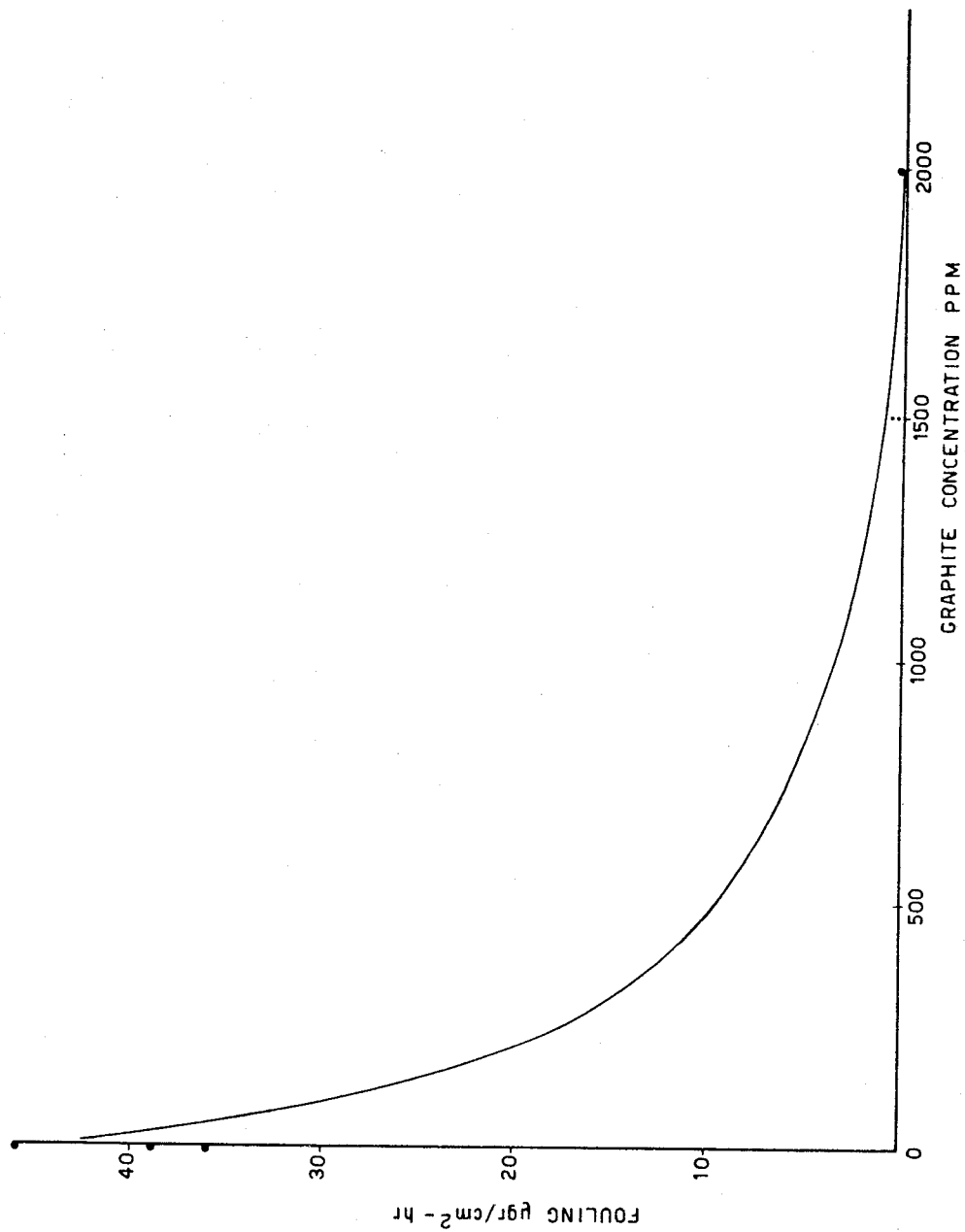

3,377,253
METHOD FOR REDUCING FOULING ON SURFACES COMING INTO CONTACT WITH ORGANIC COOLING AND/OR MODERATOR FLUIDS
Fernand Van Rutten, Varese, Meinolf Höpper, Monvalle, and Friedhelm Diletti, Gemonio, Italy, assignors to European Atomic Energy Community (Euratom), Brussels, Belgium
Filed Nov. 18, 1966, Ser. No. 595,429
Claims priority, application Netherlands, Dec. 9, 1965, 65—1,027
4 Claims. (Cl. 176—38)

ABSTRACT OF THE DISCLOSURE

Fouling on metal surfaces coming into contact with hot organic, terphenyl containing coolant used in a nuclear reactor is greatly reduced by filtration of the coolant over graphite, preferably at the operating temperature of the reactor.

---

The invention relates to a method for reducing fouling on surfaces coming into contact with organic cooling and/or moderator fluids in the operation of a nuclear reactor which is cooled and/or moderated thereby.

The problem of fouling is well-known in the petroleum industry. The efficiency of heat-exchangers and cracking furnaces is reduced by fouling on surfaces where heat exchange takes place.

In the case of a nuclear reactor using organic cooling and/or moderated fluids, e.g., a terphenyl or terphenyls, such as the fluid $OM_2$ having the composition: 14–16% ortho-terphenyl, 79–81% meta-terphenyl, 3–5% para-terphenyl and 1% diphenyl, the fouling takes place on the fuel elements and causes thermal resistance which reduces efficiency.

The composition of the fouling or deposit depends on the mechanism of formation. The deposit may be formed as a result of the presence of particles which are present in suspension in the fluid and are deposited on the fuel element; in this case the layer is composed of an organic matrix in which particles are embedded, generally $Fe_3O_4$ particles. The deposit may also be formed as a result of the chemical transport of iron from cold to hot walls. The deposit then consists mainly of inorganic material, e.g., iron or $Fe_3O_4$.

Among the circumstances that determine the rate at which the deposit is formed, e.g., wall temperature, rate of flow and composition of fluid, the composition of the fluid plays an important part. Impurities in the fluid, more particularly chlorine, iron, combined oxygen and water, are important.

It is well-known that chlorine and iron in the form of $FeCl_3$ form a good polymerisation catalyst, as has been found in the polymerisation of benzene, diphenyl, and para-terphenyl, in the presence of Lewis acids ($FeCl_3$, $AlCl_3$, $MoCl_5$ and the like). It appears that this also applies to $FeCl_3$ and the terphenyls such the fluid $OM_2$ at 250° C. $FeCl_3$ can therefore contribute to the formation of the organic matrix of the deposited layer.

It has been found that deposits in nuclear reactors due to chemical transport are formed only in the presence of chlorine.

For these reasons organic cooling and moderator fluids are required to contain no more than 2 p.p.m. of chlorine, no more than 5 p.p.m. of iron, no more than 250 p.p.m. of combined oxygen and no more than 150 p.p.m. of water.

It has now been discovered that fouling on surfaces that come into contact with organic cooling and/or moderator fluids in the operation of a nuclear reactor cooled and/or moderated thereby can be reduced by bringing these fluids into contact with graphite.

This can be done in a technically very simple manner by filtering the cooling and/or moderator fluid over graphite in the operation of the reactor, or adding graphite (powder) to the cooling and/or moderator fluid for circulation therewith during the operation of the nuclear reactor.

Preferably the fluid is contacted with graphite at the operating temperature of the cooling and/or moderator fluid in the nuclear reactor cooled and/or moderated thereby, i.e., at a temperature within the range of 300° to 400° C.

Graphite not only absorbs many substances on the surface, but also forms lamellar combinations with many substances. The nature of these combinations depends on an association between an electron donor (valence bonds of graphite) and an electron acceptor, the substance in question being absorbed between the surfaces of the graphite structure.

The best known of these association combinations are combinations of graphite with a halogen, alkali metal or chloride. A considerable quantity of the substance can be absorbed by the graphite, e.g., up to 56% by weight of the weight of the graphite of $FeCl_3$.

The formation of these combinations, more particularly of graphite with chlorides, e.g., $FeCl_3$, and even a few oxides, takes place at the aforementioned operating temperature of the nuclear reactor. Adding graphite in powder form to the organic cooling and/or moderator fluid or filtering it over graphite thus removes these impurities from the fluid and reduces fouling. Furthermore, the withdrawal of chlorides from the fluid reduces the corrosion of reactor parts.

According to tests on stationary cooling and moderator fluids ($OM_2$) containing 30% of distillation residue, and inter alia 2 p.p.m. of chlorine and 20 p.p.m. of iron, a reduction of fouling with an increasing graphite concentration as shown in the figure takes place.

In other tests in which the organic fluid was pumped in circulation, it was found that 1000 p.p.m. of graphite in suspension completely prevented fouling by a fluid of the $OM_2$ type containing 8 p.p.m. of chlorine in the form of Fe-$Cl_2$ and 15 p.p.m. of iron in the form of ferrocene. If no graphite was added this fluid caused in this cycle a deposit of 16.5μ g./cm.² an hour.

When the fluid $OM_2$ was saturated with $FeCl_3$ and then filtered over a graphite column (10 g.) at 320° C., the fluid contained 8 p.p.m. of iron after the first filtration, but after a second filtration the quantity of iron fell to less than 1 p.p.m. (analytical limit).

When 1 g. of graphite was reacted with 1.5 g. of $FeCl_3$ in 10 g. of the fluid $OM_2$ at 350° C., a lamellar combination containing 17% (by weight) of $FeCl_3$ based on the weight of the lamellar combination was found to have been formed.

What we claim is:

1. In a method for cooling a nuclear reactor wherein a terphenyl containing coolant is employed to cool the reactor, the improvement comprising reducing fouling on surfaces contacted by said terphenyl containing coolant by filtering said terphenyl containing coolant by contact with a mass of graphite to remove impurities.

2. A method according to claim 1, wherein the coolant is filtered approximately at the operating temperature of said coolant within the reactor.

3. A method according to claim 1, wherein the graphite is employed in the form of a column.

4. A method according to claim 1, wherein iron is the principal impurity removed by the graphite.

References Cited

UNITED STATES PATENTS

| | | | |
|---|---|---|---|
| 2,921,891 | 1/1960 | Colichman et al. | 176—92 |
| 2,958,637 | 11/1960 | Voorhees | 176—39 |
| 3,058,897 | 10/1962 | Slack et al. | 176—45 |
| 3,152,961 | 10/1964 | Ellard et al. | 176—38 |
| 3,228,848 | 1/1966 | Fellows | 176—39 |
| 3,228,849 | 1/1966 | Fellows | 176—39 |
| 3,228,850 | 1/1966 | Fellows | 176—39 |
| 3,243,380 | 3/1966 | Conn | 176—37 |

BENJAMIN R. PADGETT, *Primary Examiner.*

L. DEWAYNE RUTLEDGE, *Examiner.*

H. E. BEHREND, *Assistant Examiner.*